United States Patent
Behles et al.

(10) Patent No.: US 9,916,007 B2
(45) Date of Patent: Mar. 13, 2018

(54) APPARATUS FOR PROVIDING HAPTIC FEEDBACK

(75) Inventors: Thorsten Behles, Kangasala (FI); Klas Andersson, Espoo (FI)

(73) Assignee: Nokia Technologies Oy, Espoo (FI)

( * ) Notice: Subject to any disclaimer, the term of this patent is extended or adjusted under 35 U.S.C. 154(b) by 849 days.

(21) Appl. No.: 13/505,988

(22) PCT Filed: Nov. 4, 2009

(86) PCT No.: PCT/EP2009/064641
§ 371 (c)(1),
(2), (4) Date: May 25, 2012

(87) PCT Pub. No.: WO2011/054384
PCT Pub. Date: May 12, 2011

(65) Prior Publication Data
US 2012/0229424 A1    Sep. 13, 2012

(51) Int. Cl.
*G06F 3/041* (2006.01)
*G06F 3/01* (2006.01)
*G06F 1/16* (2006.01)

(52) U.S. Cl.
CPC ............ *G06F 3/016* (2013.01); *G06F 1/1601* (2013.01); *G06F 1/1626* (2013.01); *G06F 3/041* (2013.01)

(58) Field of Classification Search
USPC .................................................. 345/173, 177
See application file for complete search history.

(56) References Cited

U.S. PATENT DOCUMENTS

| | | | |
|---|---|---|---|
| 6,028,595 A * | 2/2000 | Shiga | 345/179 |
| 6,538,706 B2 | 3/2003 | Sun | |
| 7,215,329 B2 | 5/2007 | Yoshikawa et al. | |
| 2003/0067449 A1* | 4/2003 | Yoshikawa et al. | 345/173 |
| 2004/0212583 A1 | 10/2004 | Cobian | |
| 2008/0004087 A1* | 1/2008 | Baw et al. | 455/575.1 |
| 2008/0055277 A1 | 3/2008 | Takenaka et al. | |
| 2008/0202824 A1* | 8/2008 | Philipp et al. | 178/18.01 |
| 2010/0156818 A1* | 6/2010 | Burrough | G06F 3/041 345/173 |
| 2010/0309142 A1* | 12/2010 | Cruz-Hernandez | G06F 3/041 345/173 |

FOREIGN PATENT DOCUMENTS

| | | |
|---|---|---|
| CN | 1764894 A | 4/2006 |
| CN | 101227764 A | 7/2008 |
| EP | 1933539 A1 | 6/2008 |

(Continued)

OTHER PUBLICATIONS

Office Action received for corresponding European Patent Application No. 09752153.8, dated Jun. 2, 2014, 5 pages.

(Continued)

*Primary Examiner* — Sosina Abebe
(74) *Attorney, Agent, or Firm* — Harrington & Smith

(57) ABSTRACT

An apparatus comprising a first part configured to form at least part of the case of the apparatus, a second part configured to form at least part of the display for the apparatus, and a flexible membrane attached at a first area of contact to the first part and at a second area of contact to the second part and furthermore configured to connect the first part to second part.

13 Claims, 9 Drawing Sheets

(56) References Cited

FOREIGN PATENT DOCUMENTS

| EP | 2073099 A2 | 6/2009 |
|---|---|---|
| KR | 2005-0120683 | 12/2005 |
| WO | WO-2007/008518 A2 | 1/2007 |
| WO | 20091025842 A1 | 2/2009 |
| WO | 2009067708 | 5/2009 |
| WO | 20091067708 A1 | 5/2009 |

OTHER PUBLICATIONS

Office action received for corresponding Chinese Patent Application No. 200980162846.2, dated Jul. 1, 2014, 6 pages of office action and No English Translation available.
Office Action received for corresponding Korean Application No. 2012-7014343, dated Nov. 27, 2013, 6 pages.
Cairns et al., "Electromechanical Properties of Transparent Conducting Substrates for Flexible Electronic Displays", Proceedings of the IEEE, vol. 93, Issue 8, Aug. 2005, pp. 1451-1458.
International Search Report and Written Opinion received for corresponding International Patent Application No. PCT/EP2009/064641, dated Aug. 4, 2010, 12 pages.
Office Action received for corresponding European Patent Application No. 09752153.8, dated Feb. 13, 2013, 4 pages.

\* cited by examiner

Membrane will be printed (black) from the back side

507 Transparent foil (PET)

APPARATUS FOR PROVIDING HAPTIC FEEDBACK

RELATED APPLICATION

This application was originally filed as PCT Application No. PCT/EP2009/064641 filed Nov. 04, 2009.

The present invention relates to an apparatus providing haptic feedback. The invention further relates to, but is not limited to, an apparatus providing haptic feedback for use in mobile devices.

Many portable devices, for example mobile telephones are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the mode of operating the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

However such touchscreen inputs have a disadvantage with respect to mechanical keys in that the user does not experience the usual expected click or mechanical switch feedback to indicate that an input has been detected.

To attempt to overcome this some equipment has been provided with a mechanical or audible simulation of a key press.

This feedback is known as haptic feedback when felt. Some touch screen devices have been equipped with device haptic feedback, in other words an ordinary vibration such as produced by the speaker within the device is used to make the whole device shake (and also provide an audio cue of the key press) as the user touches the screen and is detected. In other devices an eccentric mass is used to vibrate the devices when the device detects that a user has touched the screen. These device-haptic devices however are themselves problematic as they produce feedback which can easily become annoying and is often switched off. Device feedback furthermore can lead to loss of accuracy of input as the whole device is vibrated and the handheld device has to be held firmly to be secured.

A second type of haptic feedback is a user interface (UI) haptic feedback (which may also be known as localized haptic feedback). The user interface (or UI) haptic device employs a user interface surface, for example the window above the display and the touch sensor which is able to be move up and down against the user's finger. Furthermore the user interface in the form of the window is able to apply a force which the user senses as the mechanical resistance generated by the button or keypad click. Typically such systems are equipped with an actuator to generate the force which is applied and which the user senses as a button click.

Present devices require actuators which require significant current to operate in order to generate significant feedback force. This is generally because the construction of the device requires that the front window is firmly located or fixed to the surrounding frame or connected in such a way to significantly damp the force generated by the actuator before it is applied.

For example, FIG. 1 shows two examples where the front window part of the display 103, and touch interface 105 are firmly connected to the frame 101. In the first example, the front window part of the display 103, touch interface 105, and foam gasket 107 are firmly or rigidly connected to the frame 101 via a clip 109 which is fixed by adhesive 111 to the frame 101. Similarly in the second example, the front window part of the display 103 and touch interface 105 is located with respect to the case 101 via the foam gasket 107 and the clip 113. In order to prevent dust and other material from entering the delicate internal circuitry and mechanical parts of the device the foam gasket 107 is arranged to seal any gap between the case and the front window/touch sensor. These foam gaskets 107 have the effect of assisting the rigid locating of the sensor and front window (especially under pressure) and require significant current to be applied to the actuator in order to generate a feedback force detectable by the user. The foam gaskets are furthermore very sensitive in mechanical tolerances and during compression create an additional force which works against the actuator feedback force.

This application proceeds from the consideration that the provision of a flexible membrane connecting a display to the cover or main body of the device and capable of transferring the force provided by an actuator to the user by flexing and not significantly damping the force may provide both the physical and mechanical support for the display without unduly limiting the action of the display in producing tactile or haptic feedback.

It is an aim of at least some embodiments of the invention to address one or more of these problems.

According to an aspect of the invention, there is provided an apparatus comprising: a first part configured to form at least part of the case of the apparatus; a second part configured to form at least part of the display for the apparatus; and a flexible membrane attached at a first area of contact to the first part and at a second area of contact to the second part and furthermore configured to connect the first part to second part.

The first part may comprise: an outer casing part; and an inner frame part, wherein the flexible membrane first area of contact is configured to be attached between the outer casing part and the inner frame part.

The second part may comprise: a front window layer; at least one display layer; and at least one touch interface layer.

The flexible membrane second area of contact is preferably configured to be attached by at least one of: between two of the front window layer, at least one display layer, and at least one touch interface layer; between two of the display layers; and between two of the touch interface layers.

The flexible membrane may comprise at least part of: one of the display layers and one of the touch interface layers.

The apparatus may further comprise an actuator configured to generate a force transmitted to the second part.

The actuator is preferably at least one of: a piezo-actuator; a dynamic eccentric mass actuator; a moving coil actuator; and a moving magnet actuator.

At least one of the flexible membrane and second part is preferably configured to generate audio waves in response to the force.

The flexible membrane may comprise at least one of: an elastomer; a silicone foil; a polyethylene terephthalate (PET) polyester film; and a polycarbonate film.

The flexible membrane may have a thickness substantially in the range from 0.025 mm to 0.18 mm.

The flexible membrane may be attached to at least one of the first part and the second part by a layer of optically clear adhesive.

The flexible membrane may comprise at least one hole configured to co-operate with an associated pin on the first part so to locate the flexible membrane and the second part with respect to the first part.

According to a second aspect of the invention there is provided a method of operating an apparatus comprising a first part configured to form at least part of the case of the apparatus and a second part configured to form at least part of the display for the apparatus by: connecting the first part to second part by a flexible membrane attached at a first area of contact to the first part and at a second area of contact to the second part.

The first part may comprise an outer casing part, and an inner frame part, wherein attaching the flexible membrane first area of contact may comprise attaching the flexible membrane between the outer casing part and the inner frame part.

The second part may comprise a front window layer, at least one display layer, and at least one touch interface layer and attaching the flexible membrane second area of contact may comprise attaching the flexible membrane in at least one of the following ways: between two of the front window layer, at least one display layer, and at least one touch interface layer; between two of the display layers; and between two of the touch interface layers.

The method may further comprise transmitting a force to the second part.

The method may further comprise generating the force in an actuator.

The method may further comprise generating audio waves in response to the force.

The method may further comprise attaching the flexible membrane to at least one of the first part and the second part by a layer of optically clear adhesive.

The method may further comprise locating the flexible membrane and the second part with respect to the first part by providing at least one flexible membrane hole configured to co-operate with an associated first part pin.

For better understanding of the present invention, reference will now be made by way of example to the accompanying drawings in which.

Figure 7A:
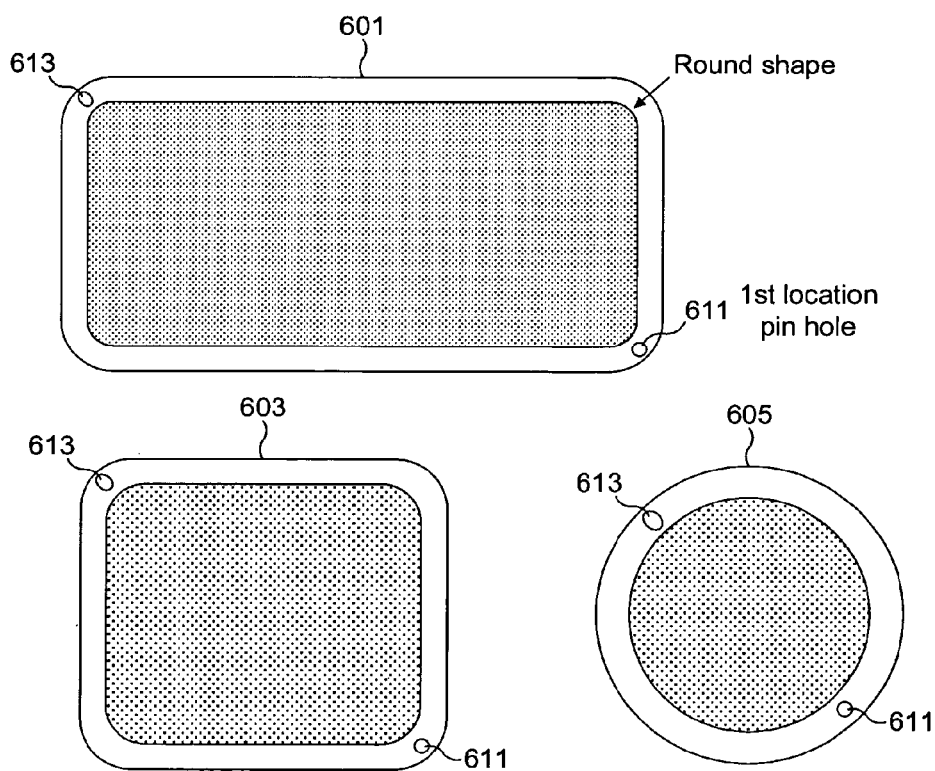
Figure 7B:
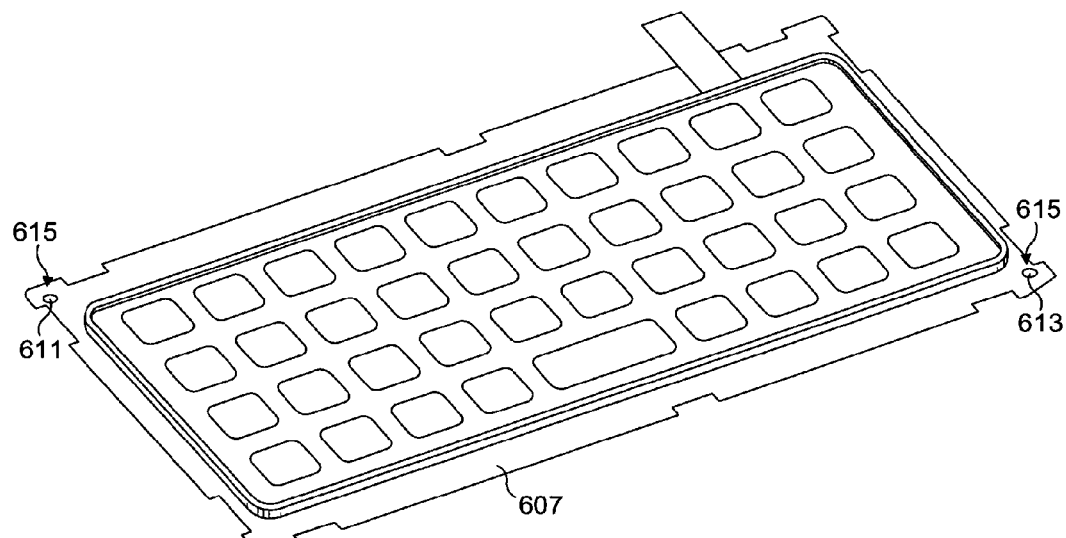
Figure 7C:
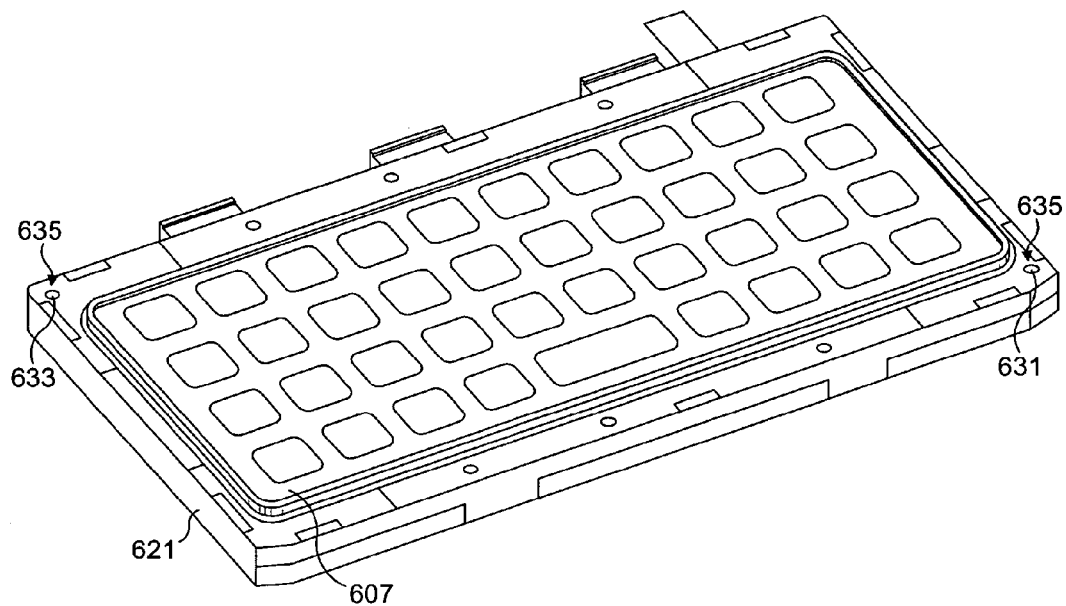
Figure 7D:
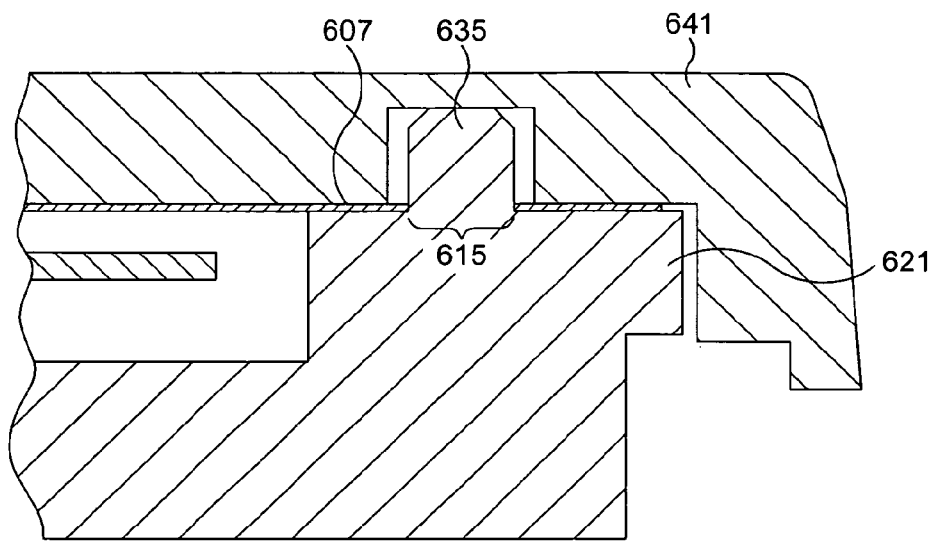
Figure 7E:
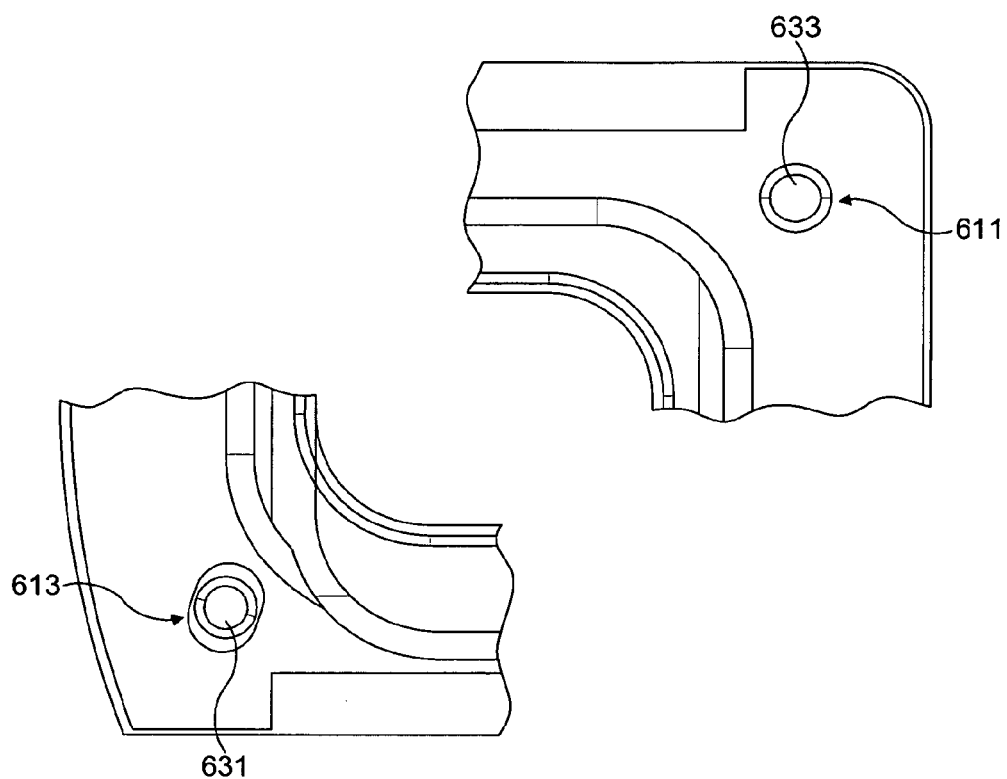
Figure 8A:
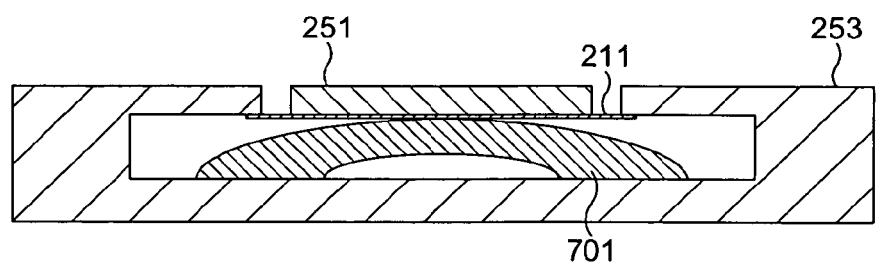
Figure 8B:
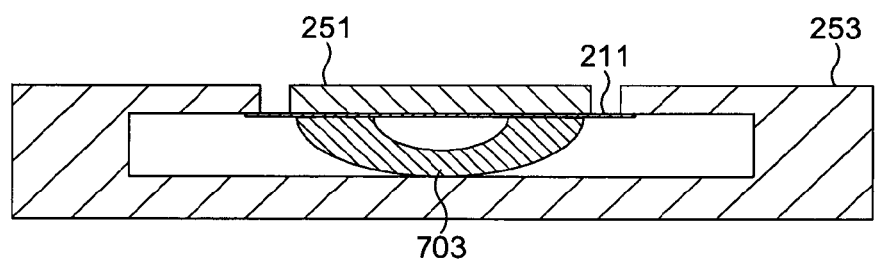
Figure 8C:
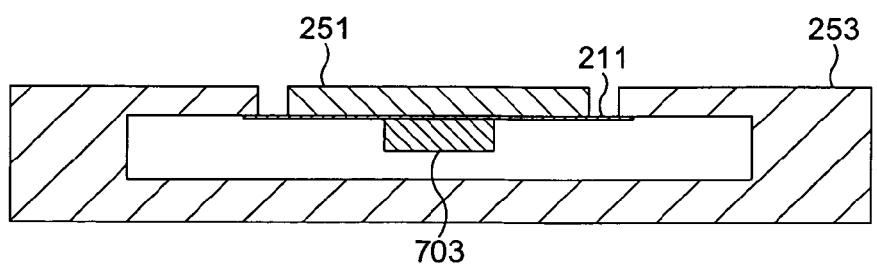

FIGS. 7a, 7b, 7c, 7d, and 7e show schematically a flexible membrane as implemented in embodiments may be located with respect to the apparatus; and FIGS. 8a, 8b, 8c show schematically some embodiments with the actuator and the flexible membrane in further detail.

The application describes apparatus and methods of construction for apparatus suitable for generating more interactive touch screen devices capable of creating a more interactive user experience than with just a conventional touch screen display. Thus as described hereafter in embodiments of the application, the use of a flexible membrane for connecting the display with the cover or case enables the apparatus to be configured such that the user experience is greatly enhanced. The construction of such a flexible membrane and some examples of its implementation within apparatus is described in further detail hereafter.

Figure 1:
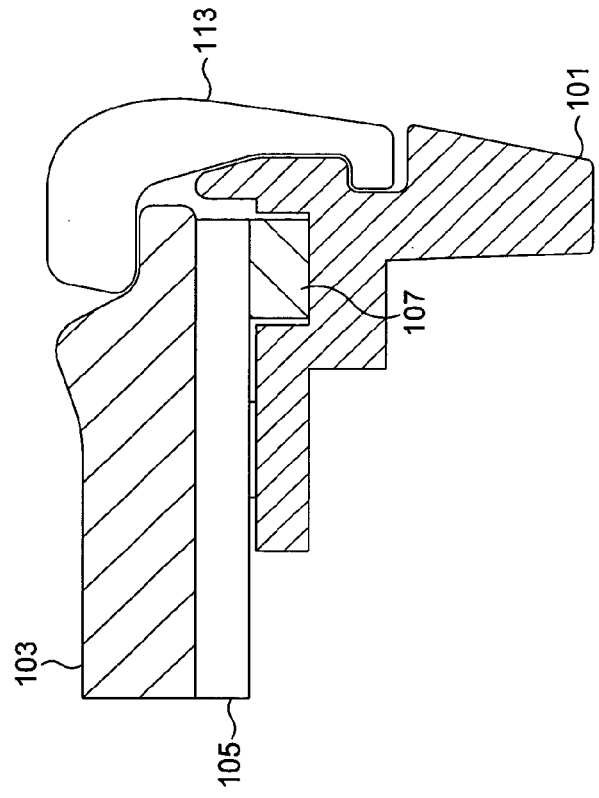
FIG. 1 shows sectioned views of known displays.
Figure 1:
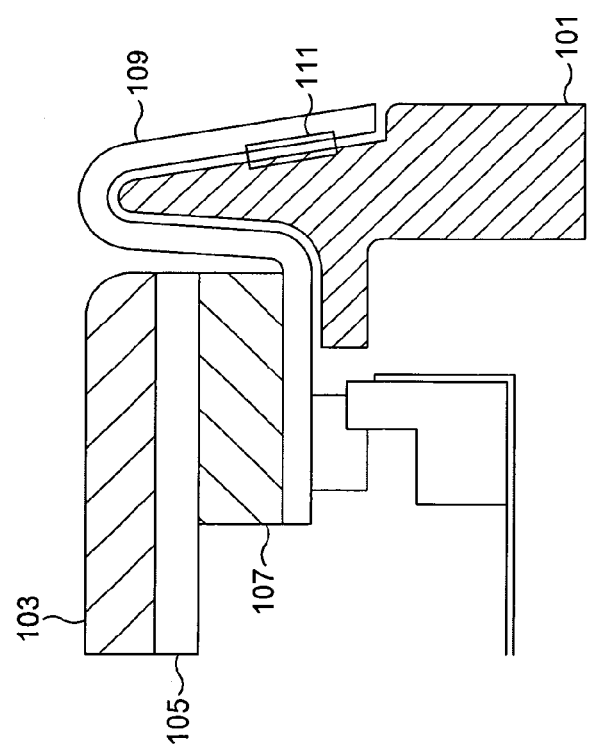
Figure 2:
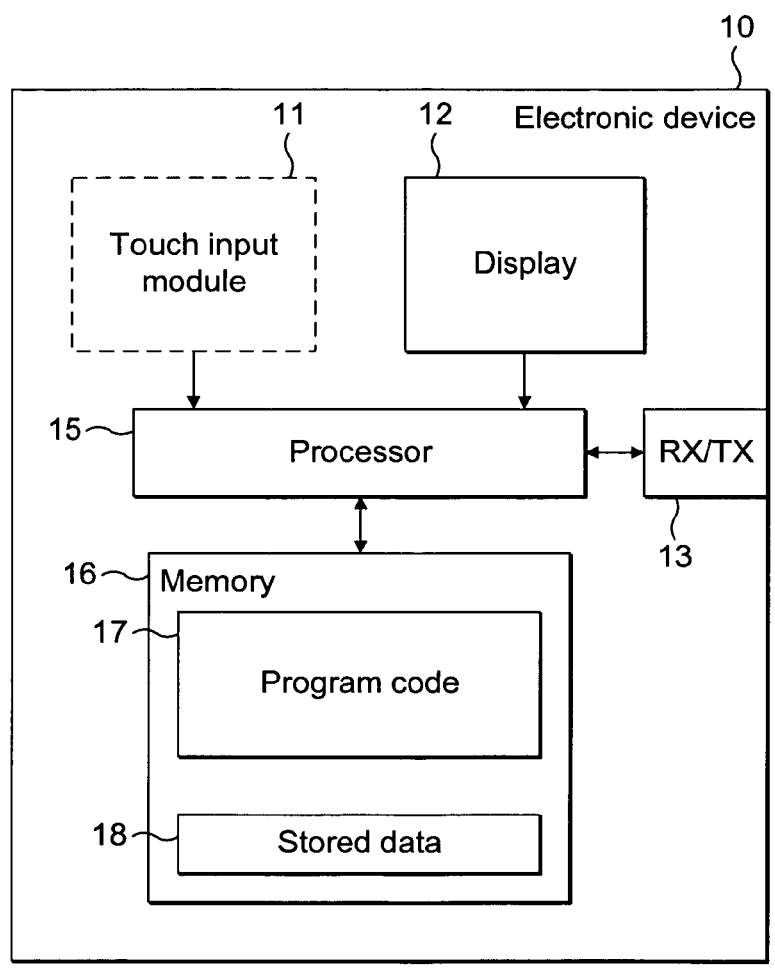
FIG. 2 shows schematically an apparatus suitable for employing embodiments.

FIG. 2 which discloses a schematic block diagram of an exemplary electronic device 10 or apparatus on which embodiments of the application may be implemented. The electronic device 10 is configured to provide improved user interface or localized haptic feedback and interaction.

The electronic device 10 is in some embodiments a mobile terminal, mobile phone or user equipment for operation in a wireless communication system. In other embodiments, the electronic device is any suitable electronic device configured to provide a image display, such as for example a digital camera, a portable audio player (mp3 player), a portable video player (mp4 player). In other embodiments the apparatus may be any suitable electronic device with touch interface (which may or may not display information) such as a touch-screen or touch-pad configured to provide feedback when the touch-screen or touch-pad is touched. For example in some embodiments the touch-pad may be a touch-sensitive keypad which may in some embodiments have no markings on it and in other embodiments have physical markings or designations on the front window. An example of such a touch sensor may be a touch sensitive user interface to replace keypads in automatic teller machines (ATM) that does not require a screen mounted underneath the front window projecting a display. The user may in such embodiments be notified of where to touch by a physical identifier—such as a raised profile, or a printed layer which may be illuminated by a light guide.

The electronic device 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 may be referred to as the display part or touch display part.

The processor 15 may be configured to execute various program codes 17. The implemented program codes 17, in some embodiments the code may comprise such routines as touch capture digital processing or configuration code where the touch input module inputs are detected and processed, display image processing and image interaction code where the data to be passed to generate the display images is generated for example based on the detection of the input. The implemented program codes 17 may in some embodiments be stored for example in the memory 16 for retrieval by the processor 15 whenever needed. The memory 15 in some embodiments may further provide a section 18 for storing data, for example data that has been processed in accordance with the application, for example display information data.

The touch input module 11 may comprise any suitable touch screen interface technology. For example in some embodiments the touch screen interface may comprise a capacitive sensor configured to be sensitive to the presence of a finger above or on the touch screen interface. The capacitive sensor may comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module may be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This causes a change in the electrical current which is registered as a touch event and sent to the processor for processing.

In some other embodiments the touch input module may further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition.

The apparatus 10 may in embodiments be capable of implementing the processing techniques at least partially in hardware, in other words the processing carried out by the processor 15 may be implemented at least partially in hardware without the need of software or firmware to operate the hardware.

The transceiver 13 enables communication with other electronic devices, for example in some embodiments via a wireless communication network.

The display 12 may comprise any suitable display technology. For example the display element may be located below the touch input module and project an image through the touch input module to be viewed by the user. The display 12 may comprise any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 comprises one of the display technologies projected using a light guide to the display window. As described above the display 12 in some embodiments may be implemented as a physical fixed display. For example the display may be a physical decal or transfer on the front window. In some other embodiments the display may be located on a physically different level from the rest of the surface, such a raised or recessed marking on the front window. In some other embodiments the display may be a printed layer illuminated by a light guide under the front window.

Figure 3:
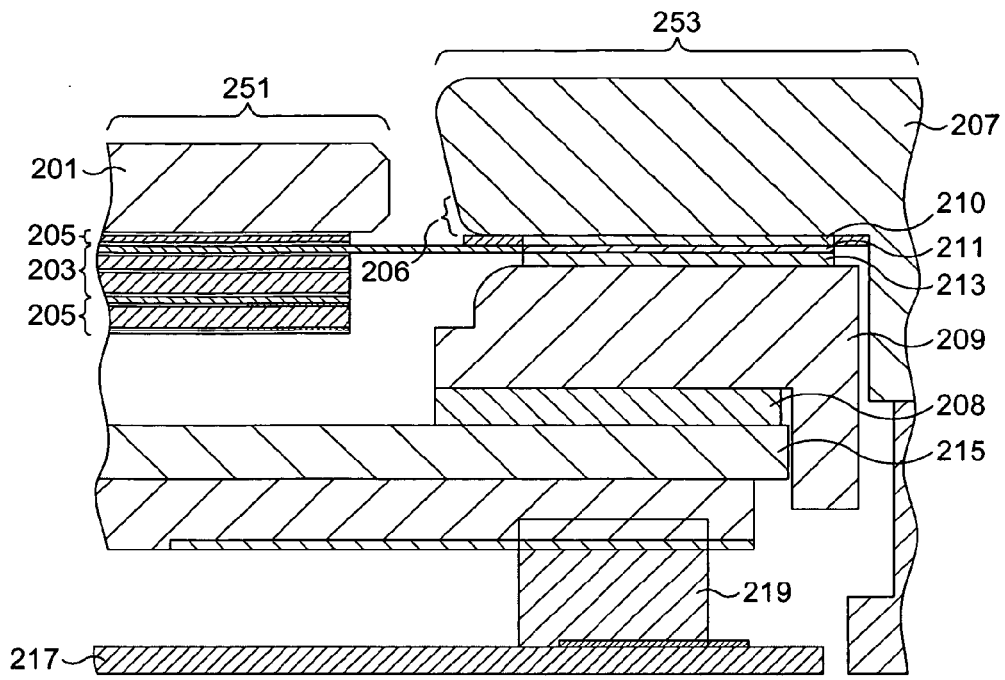
FIG. 3 shows an example topology for apparatus according to some embodiments.

With respect to FIG. 3, a schematic view of the cross section through apparatus 10 according to some embodiments of the application is shown. The cross section shown in FIG. 3 shows only part of the whole apparatus or electronic device 10. The apparatus 10 as shown in FIG. 3 may comprise an outer frame (or front cover part) 207 which may be constructed from any suitable material and is configured to provide a structure to which other components may be attached and/or may protect other components from damage. In some embodiments the outer frame 207 may comprise an inner surface to which internal components are located and an outer surface to which external components are located and which is exposed to the elements. In some embodiments the junction between the inner surface and the outer surface is connected via a fillet or chamfer to smooth the junction. In such embodiments by smoothing the junction there is less chance of damaging the membrane mentioned later if the membrane is forced towards the outer frame 207.

Furthermore in some embodiments the inner surface of the outer frame 207 is attached to a flexible membrane 211 via an adhesive layer 210. In some embodiments the adhesive layer extends beyond the static area of contact between the inner surface of the outer frame and the flexible membrane 211 in order to provide additional protection at any dynamic area of contact between the inner surface of the outer frame 207 and the flexible membrane 211. The flexible membrane in some embodiments may be manufactured from an elastomer. The elastomer in some embodiments may be any suitable film or foil. For example the suitable film or foil may be in various embodiments a polyethylene terephthalate (PET) film, a polycarbonate (PC) foil, or a silicone foil.

The flexible membrane 211 may furthermore be attached via a further adhesive layer 213 to an outer surface of an inner frame part 209. The inner frame 209 and the outer frame 207 thus in these embodiments locate at least some of the flexible membrane 211. In some embodiments the junction between the outer surface of the inner frame 209 and the inner surface of the inner frame 209 are connected via a fillet or chamfer to smooth the junction for a similar reason as above for protecting the membrane while the membrane is dynamic. Similarly in some embodiments the further adhesive layer 213 may extend beyond the static area of contact to provide additional protection at any dynamic area of contact between the outer surface of the inner frame 209 and the flexible membrane 211.

In some embodiments the inner frame 209 and specifically the inner surface of the inner frame 209 is furthermore attached to a piezo-actuator 215.

The piezo-actuator 215 may be configured to vibrate when a current is passed through the actuator. In other embodiments any other suitable actuator such as an eccentric mass may be employed to produce a force which may be passed through the inner frame 209 to the inner part 251 with the flexible membrane 211 causing only slight damping to the force. In some further embodiments the membrane may directly experience the force which is then transmitted to the inner part 251. For example in some embodiments the inner part 251 may be connected to a moving coil or moving magnet actuator which generated the force. In some other embodiments the flexible membrane 211 may be connected to a moving coil or moving magnet actuator which generates the force.

In some embodiments the piezo-actuator 215 is further connected via a conductive soft surface mounted technology (SMT) pad 219 to a printed wiring board (PWB) which provides an electrical connection between the piezo-electric layer 215 and the printed wiring board 217. In some embodiments the printed wire board 217 may be replaced by a printed circuit board (PCB) suitable for mounting surface mounted technology or electrical components on it.

In such embodiments the inner frame 209 and the outer frame 207 sandwiching or locating part of the flexible membrane 211 may be considered to define a case part 253 or peripheral part. The case part 253 typically surrounds the inner part or display module 251, circuitry such as that on the PWB 217 and the actuator such as the piezo-actuator 215.

Furthermore in some embodiments the flexible membrane 211 connects the peripheral part 253 to the inner part 251.

Figure 4:
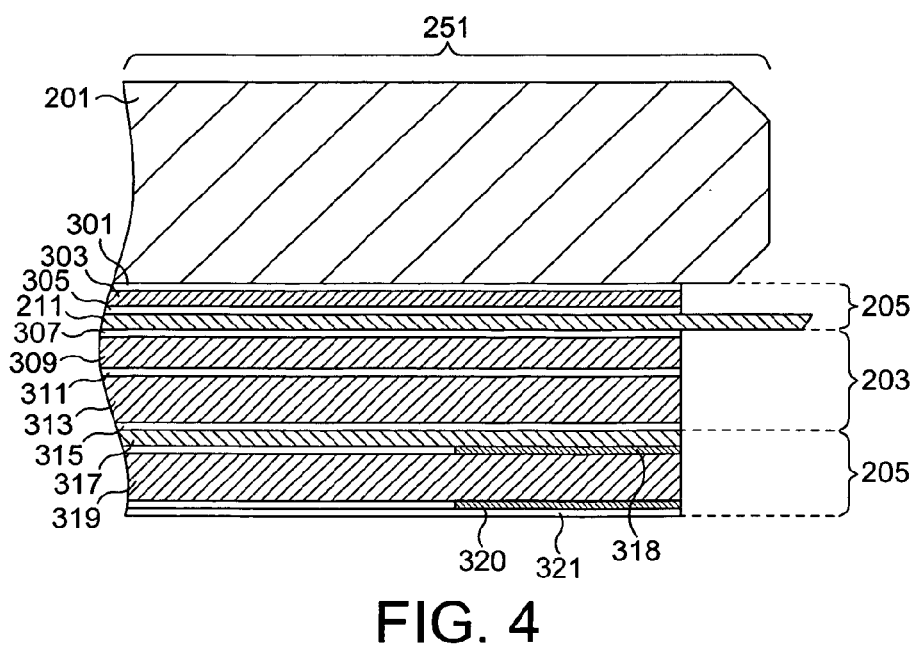
FIG. 4 shows the example topology for apparatus according to some embodiments in further detail.

With respect to FIG. 4, a schematic view of the inner part 251 with respect to the flexible membrane 211 is shown in further detail.

The inner part 251 as shown in FIGS. 3 and 4 is constructed as a series of layers.

The inner part 251 in some embodiments comprises a protective or front window 201.

The front window 201 may in some embodiments be manufactured from glass. In some embodiments the glass may be coated with optical (to reduce glare) or oleophobic (to resist fingerprints) films to enhance the characteristics of the front window. The front window 201 may in embodiments overlay the other inner part 251 components and is configured to protect the other inner part 251 components. In such embodiments, the front window made from glass may be approximately 0.5 to approximately 1.2 millimeters thick.

In some other embodiments the front window 201 may be manufactured from a plastic or other protective screen material suitable for both enabling the other components from performing their tasks and protecting the other components from physical of other damage. For example the front window 201 may provide a dielectric material between a capacitive touch interface 203 and the user's finger, while the front window 201 is also sufficiently transparent to permit any display elements under the window being seen by the user.

In some embodiments as shown in FIG. 3 and FIG. 4 the inner part 251 further comprises the display 12. The display 12 may in some embodiments comprise a static display array 205 located beneath front window 201 and projected up to the user through the front window 201.

The static display array 205 may comprise a graphic layer 303 which may be connected to the front window 201 by a first optically clear adhesive (OCA) layer 301. The first optically clear adhesive layer may be approximately 0.025 to approximately 0.05 mm thick and be any suitable OCA material.

The graphic layer 303 may comprise any suitable material for blocking projected light. In such embodiments the graphic layer 303 may be approximately 0.05 to approximately 0.07 mm thick. Furthermore in some embodiments the graphic layer may be printed directly onto the underside of the front window 201. In some other embodiments, for example where the display 12 is a dynamic display, the graphic layer 303 may comprise any suitable material for permitting the controllable and selectable projection of light—for example a liquid crystal display element and colour filter layer, E-ink etc.

The graphic layer 303 may furthermore in embodiments be connected to the flexible membrane 211 via a second optically clear adhesive (OCA) layer 305. The second optically clear adhesive layer 305 may be approximately 0.025 to approximately 0.05 mm thick and may be the same material as the first and other OCA layers.

The flexible membrane 211 may be constructed out of polyethylene terephthalate (PET) polyester film. In some embodiments the film may be biaxially oriented polyethylene terephthalate which may be used because of its high tensile strength, chemical and dimensional stability, transparency and also electrical insulation properties. The PET flexible membrane layer 211 may in some embodiments be approximately 0.025 to approximately 0.18 mm thick as this thickness has been shown to provide both the flexibility in response to forces from the user and from the actuator but also has sufficient tensile strength not to break under such forces. The PET flexible membrane 211 may be constructed by any suitable means. For example the PET layer may be constructed by extrusion onto a chill roll which quenches it into an amorphous state. The PET flexible membrane layer furthermore in some embodiments may be constructed in such a way that the crystallites grow rapidly but reach the boundary of neighbouring crystallites and remain smaller than the wavelength of visible light and thus produce a film having excellent clarity.

The inner part 251 in some embodiments further comprises the user interface 11 in the form of a capacitive touch interface 203.

The capacitive touch interface 203 comprises a series of layers. The layers in the capacitive touch interface 203 may comprise at least one Indium Tin Oxide on PET layer (shown by the first and second ITO on PET layers), and a protective hard coated PET layer 317. Each layer may be fixed to the neighbouring layers by the use of an optically clear adhesive to form a sandwich of layers.

The flexible membrane 211 for example is connected via a third layer of optically clear adhesive (OCA) 307 to a first layer of indium tin oxide (ITO) on PET. The third layer of OCA 307 may be approximately 0.025 to approximately 0.05 mm thick.

The first layer of indium tin oxide (ITO) on PET 309 in some embodiments is the first of the capacitive touch interface 203 layers. In other words the first ITO on PET layer 309 provides a first layer capable of detecting the capacitive coupling produced by the user's finger when it touches the front window 201. The first layer of ITO on PET 309 may be approximately 0.05 to 0.2 mm thick.

The first layer of ITO on PET layer 309 may be connected to a second ITO on PET layer 313 via a fourth layer of optically clear adhesive (OCA) 311. The fourth layer of OCA 311 may in some embodiments be approximately 0.025 to approximately 0.05 millimeters thick.

The second layer of ITO on PET 313 may be a further layer capable of detecting the capacitive coupling produced by the user's finger when it touches the glass window 201. The second ITO on PET layer 313 may in some embodiments be approximately 0.05 to approximately 0.2 mm thick.

The second ITO on PET layer 313 is in some embodiments further attached via a fifth optically clear adhesive (OCA) layer 315 to a hard coated layer of PET 317. The fifth optically clear adhesive layer 315 may be approximately 0.025 to approximately 0.05 mm thick. The hard coated PET layer 317 may be approximately 0.025 to approximately 0.18 millimeters thick. The hard coated PET layer 317 provides protection to the other PET layers during the construction of the device.

Although the capacitive touch interface layers have been described as being ITO on PET layers it would be understood that the capacitive touch interface layers may comprise any suitable material, for example ITO on glass.

Beneath the capacitive sensor layers 203 are further display 205 layers. In the example shown in FIGS. 3 and 4 the further display layers comprise light guide layers for projecting a light, which may be a diffused light source, towards the user. In the examples shown a sixth optically clear adhesive (OCA) layer 318 connects the hard coated PET layer 317 with a light guide layer 319. The sixth optically clear adhesive layer 315 may be approximately 0.025 to approximately 0.05 mm thick. The light guide layer comprises any suitable material for conveying a light from a light source (not shown) and projecting the light to the user. In some embodiments the light guide may diffuse the light to produce a more pleasing display image.

The light guide 319 furthermore may be connected via a seventh optically clear adhesive (OCA) layer 320 to a further PET layer 321. The further PET layer may be a hard coated PET layer which may provide both support for and protect the light guide layer from physical damage.

In other embodiments the display 205 is not a filtering display where a uniform (or generally uniform) light source is filtered to produce an image but may be a generated display such as an LED or OLED display in which case the display layers may all be located beneath the interface layers.

Although in FIGS. 3 and 4 the PET flexible membrane layer 211 is shown sandwiched between the graphic layer 303 and the first ITO on PET layer 309 it would be understood that the flexible membrane may in some embodiments be located at any suitable strata. For example in some embodiments the PET flexible membrane layer 211 may be sandwiched between the front window 201 and the graphic layer 303, between two of the touch interface layers 203 or between the touch interface layers 203 and the further display layers 205.

Furthermore in some embodiments the flexible PET membrane layer 211 may be manufactured as one of the other above described PET films. For example the flexible PET membrane may be an extension of one of the ITO on PET layers extended beyond the shape of the inner part to enable it to be fixed to the case. In such embodiments the ITO on PET layer may thus be both the flexible membrane connecting the inner part 251 to the peripheral part 253 and be sensitive to capacitive changes.

Although the above examples feature the flexible membrane as a PET layer it would be understood that any suitable material may be employed. For example in some embodiments the flexible membrane may be formed by a polycarbonate layer. In such embodiments a thickness of approximately 0.1 mm polycarbonate may provide sufficient tensile strength and flexibility.

The flexible membrane 211 may be considered to be a laminar film or layer which is located at least at some contact area to the inner part 251 and at least at some other contact area to the peripheral or case part 253. The flexible membrane furthermore in these embodiments maintains a flexible connection between the inner part 251 and the output part 253. In other words the flexible membrane 211 is configured in these embodiments to be flexible in that it is elastic in nature such that when pressure is applied to the front window 201 the flexible membrane 211 can move or flex relative to the 'fixed part' of the front cover and thus the inner part 251 may move relative to the peripheral part 253. Furthermore the flexible membrane layer 211 in such embodiments may permit without undue damping the transmission of force generated by a piezo-electrical actuator 215 such as a force of 1 to 2 N to the inner part 251 which may be sensed by the user.

Furthermore the flexible membrane 211 may further limit the motion of the inner part 251 relative to the peripheral part 253. The flexible membrane 211 may therefore prevent the inner part 251 from 'hovering'. Hovering is an effect experienced by a user where when the inner and outer parts can move laterally as well as vertically with respect to each other. This for example is found in systems where gaskets wear or are loose and thus produce a slipping, tipping or rolling motion of the inner part relative to the peripheral part. This effect is especially noticeable in large touch interfaces and touch screen displays. This hovering may not only be unpleasant to interact with as the button press feels broken, but may vibrate and generate a buzzing or noise which would lead the user to think that the product was faulty or sub-standard. The flexible membrane 211 in some embodiments thus may generate no or only negligible damping force on the inner part nor transmit any or only negligible force to the case through the membrane to limit any case vibration.

The flexible membrane 211 is preferably light and does not therefore produce significantly more undamped weight in addition to the mass of the suspended inner part 251 to be moved by the piezo-actuator 215 force. Preferably in some embodiments the elasticity or flexibility of the flexible membrane 211 is such that it enables a vertical or sheer displacement of the inner part 251 with respect to the case part 253 of approximately 100 microns from peak-to-peak. This amount of displacement allowed during touching or pressing the inner part 251 and the force generated by the piezo-actuator 215 and transmitted by the flexible membrane 211 is such that the user experiences a response similar to that of pressing a physical key or button.

In some embodiments the piezo-actuator 215 may be modulated in such a way that the modulation transmitted via the flexible membrane laminar to the display causes the display to further generate audible oscillations. In other words in some embodiments the inner part 251 may be used as a flat panel speaker structure where the flexible membrane 211 provides sufficient damping (but not under-damping or over-damping) in the transmission of the piezo-actuated vibration to the display element. In further embodiments, the flexible membrane 211 is applied across the surface from the peripheral part on one side through the inner part 251 to a peripheral part on the other side of the device, or in some embodiments completely surrounding the inner part 251 and extending to the cover on the periphery of the apparatus. In such embodiments the flexible membrane may thus provide a dust and moisture proof seal protecting the delicate electronic circuitry and mechanical components from water, dust, or other materials.

It would be further understood that as well as providing such advantages as described above the flexible membrane, when close to the front window has the added advantage to providing a degree of splintering or shatter protection. Thus the device when landing on the front window is less likely to shatter and splinter and therefore less likely to cause an injury to the user and furthermore the flexible membrane may further support the front window and thus slightly reduce the possibility of cracks occurring due to physical or other stresses applied to the front window.

Figure 5:
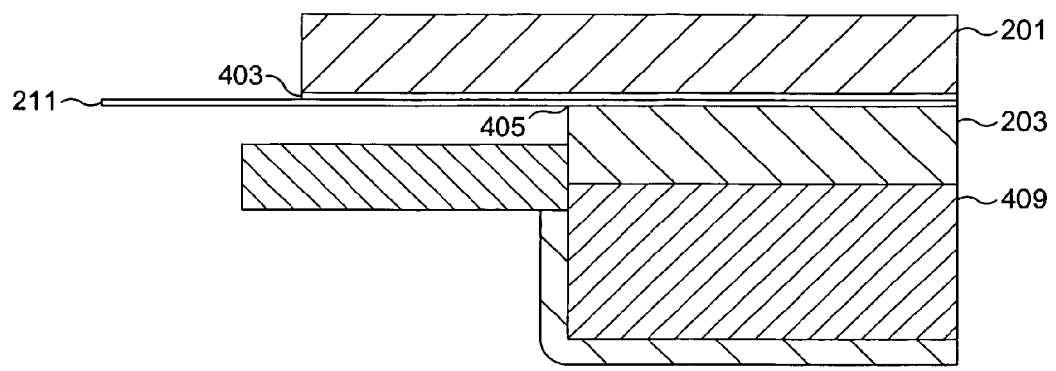
FIG. 5 shows a second example topology for apparatus according to some further embodiments.

With respect to FIG. 5, a schematic view of a cross section of a further example demonstrating the use of the flexible membrane. The inner part 251 comprises a front window 201 which performs a similar role to the window shown in FIGS. 3 and 4 in providing a protective layer over the sensitive touch layers and an area for the user to connect with. The display window 201 may be glass or transparent plastic.

The display window 201 may be in some embodiments connected to the flexible membrane 211 via an optically clear adhesive layer 403. The flexible membrane may in this example be a PET membrane, or a polycarbonate membrane of sufficient thickness to support the suspended inner part components but be flexible enough to allow the suspended components to move in response to a small applied force. The area of the flexible membrane 211 furthermore is greater in area than the inner part 251 and at least a portion of the flexible membrane 211 is configured to be attached to a case or peripheral part (not shown in FIG. 5).

The flexible membrane 211 may in some embodiments be attached to the capacitive touch interface 203 by a further OCA layer 405. In some embodiments the touch interface 203 may be made from ITO on PET layers. In other embodiments the touch interface 203 may be ITO on glass layers.

The capacitive touch interface 203 furthermore may overlie and is further attached to the dynamic display 409. The dynamic display 409 may be any suitable display technology such as those mentioned above, for example LCD, OLED, electronic ink (E Ink) suitable of projecting an image from the dynamic display 409 through the touch interface 203 layers, the flexible membrane 211 and the front window 201 to be viewed by the user.

Thus in the example shown in FIG. 5 an example is shown where the flexible membrane 211 is located between a front window 201 and the capacitive touch interface 203.

With respect to FIGS. 6a, 6b, 6c and 6d, a further example of the use of flexible membranes which are part of the display module may be used to attach the display module to the case or cover is shown. With respect to FIG. 6a, a physical schematic representation of a mobile device is shown. The case part 501 and the inner or 'display' part 503 are shown. Due to manufacturing tolerances there may be a gap 505 located between the case 501 and the display module 503. The gap 505 between the case 501 and display module 503 in current designs is typically completely filled by the use of a silicone gasket. However in some embodiments of the application the gap may be closed by use of the flexible membrane. The structure of the display module 503 is shown in further detail in FIGS. 6b and 6c. With respect to FIGS. 6b and 6c the upper strata of the 'display' part 503 is shown in further detail (in other words the inner part without the touch interface or light guide layers shown). The upper strata of the display part 503 comprises a front or display window 506, which as discussed previously may be constructed as a glass or transparent plastic layer. Furthermore the upper strata of the display module 503 comprises a graphic layer 508 below the display window layer 506 and printed directly onto the display window layer 506, a layer of optically clear adhesive 509 and a flexible membrane layer 507. In these embodiments the flexible membrane layer 507 may be constructed from a layer of transparent PET or polycarbonate. The flexible membrane layer 507 may be divided into two sections. The first flexible membrane layer section 507b is the section which lies beneath the display window 506 (and above the touch sensor layers not shown in FIGS. 6a to 6c). The first flexible membrane layer section 507b is in some embodiments, as described above, a transparent layer. The second flexible membrane layer section 507a is the section which is on the peripheral edge of the display module and is designed to close the gap between the 'display' part 503 and the case part 501. In some embodiments the second flexible membrane layer section 507a may in some embodiments be printed with a colour in order to prevent the user's attention from being diverted from the display part. For example the second flexible membrane layer section 507a may in some embodiments be printed black.

Figure 6A:
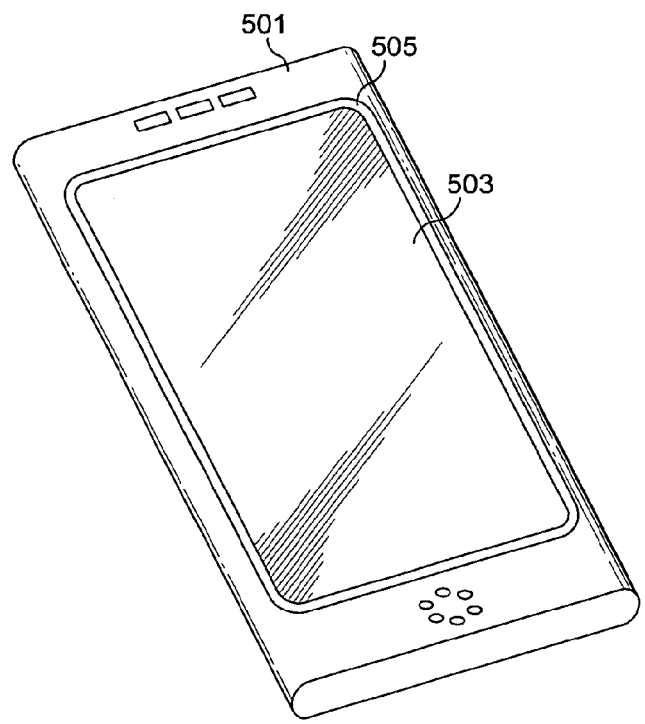
FIGS. 6a, 6b, 6c and 6d show a third example topology for apparatus according to some further embodiments.
Figure 6B:
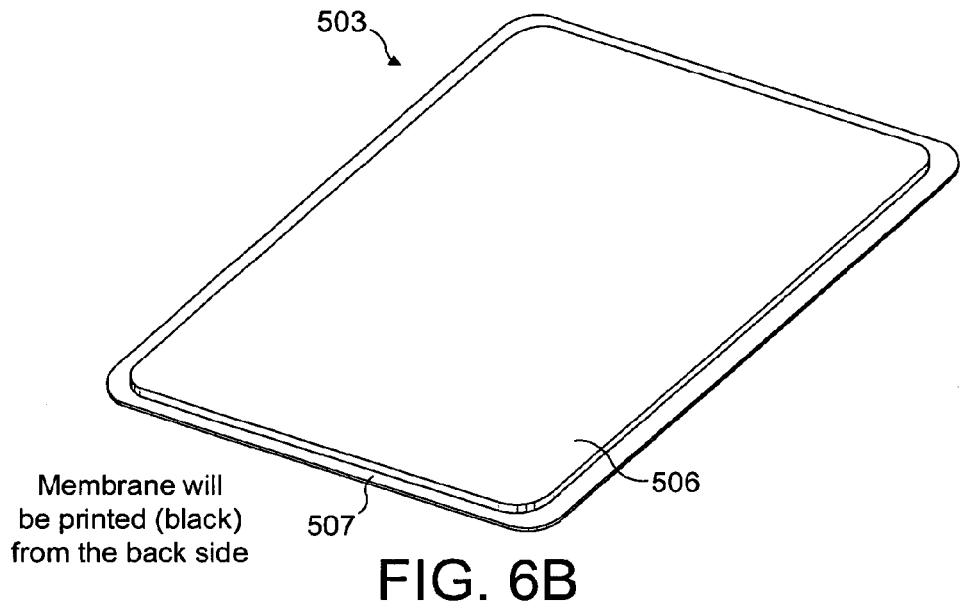
Figure 6C:
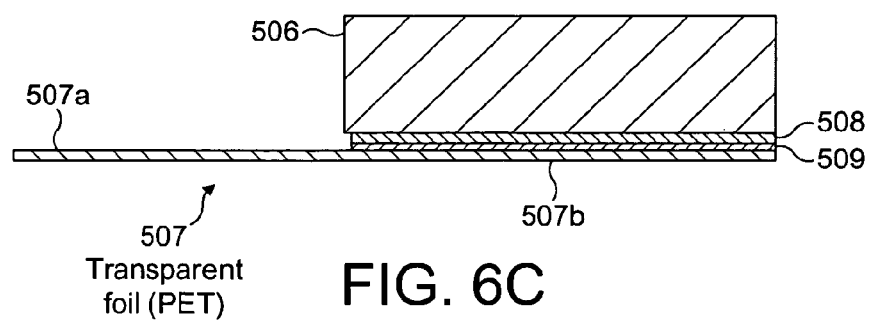
Figure 6D:
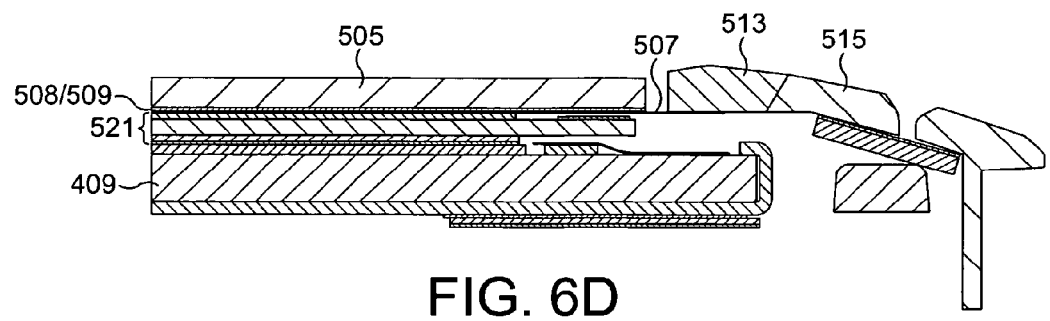

FIG. 6d shows the flexible PET layer shown previously is attached via a further optically clear adhesive layer to the lower 'display' part strata such as the sensor layers 521 and the display 409. FIG. 6d furthermore shows a sectioned diagram where the flexible membrane layer 507 is also attached by an OCA layer to the cover part such as the middle cover part 513 which in turn is connected to the outer cover part 515. Thus as can be seen the flexible membrane 507 seals or closes the gap between the case part and the display part.

Thus the flexible membrane may in some embodiments provide a display not only is capable of being used to produce good haptic feedback by being relatively undamped but also provides a seal to protect the mechanics and electrical circuitry from dust and moisture from entering the front of the device.

With respect to FIGS. 7a to 7e examples of how in some embodiments the flexible membrane may be located with respect the outer part.

FIG. 7a for example shows plan views of three embodiments where the flexible membrane (as part of the inner part) is manufactured with differing shape front windows. The first example 601 has a membrane which has a rounded corner rectangle shape, the second example 603 has a rounded corner square shape and the third example 605, has a membrane which has a circular shape. The front window for each of the examples is shown with also rounded edges in order to prevent the front window dynamically damaging the flexible membrane.

Each of the membrane has at opposite corners (for the first example 601 and the second example 603) or opposite to each other (for the third example 605) a hole. The first hole is the first pin hole 611 (a circular hole), and the second hole is the second pin hole 613. The holes are configured to co-operate with associated pins for locating the orientation of the flexible membrane in production and furthermore maintaining a approximately even distance between the inner and outer parts.

FIG. 7b shows a further example where the inner part 607, complete with graphical layer and touch interface comprises a flexible membrane with the pin holes 615 in opposite corners. The first pin hole (circular hole) 611 is shown in the top left corner of the inner part 607 and the second pin hole (oval or long hole) 613 is shown in the bottom right corner of the inner part 607. The first pin hole is in some embodiments called the fix point hole or the location pin hole as it is typically used to accurately locate the inner part at a first point. The second pin hole is also known as the 'long hole' and typically larger in at least one dimension than needed to co-operate with an associated pin in order that the hole and pin combination are able to compensate for length and angular tolerances.

With respect to FIG. 7c the co-operation between the inner part as shown in FIG. 7b and the outer part is shown in further detail. The outer part 621 shown as a frame comprises two pins 635 at opposite corners of the frame. The first pin 633 is located at the top left corner of the frame 621 and the second pin 631 is located at the bottom right corner of the frame 621. The first pin 633 in some embodiments is configured to co-operate with the first pin hole 611 located in the top left corner of the flexible membrane 607 and the second pin 631 in some embodiments is configured to co-operate with the second pin hole 613 located in the bottom right corner of the flexible membrane 607.

This co-operation is shown in the cross-sectional view shown in FIG. 7D where the frame 621 and the pin 635 is configured to co-operated with the pin hole 615 in the flexible membrane inner part 607. Furthermore an outer cover 641 protecting the pin 635 from mechanical damage is shown.

The difference between the first pin hole (circular) 611 and the second pin hole (oval) 613 is shown in further detail in FIG. 7e. The first pin hole (circular) in some embodiments is shown to be a close fit with the first pin 633, wherein the second pin hole 613, being long, is as described previously able to allow or compensate for angular or length tolerances such as produced in manufacturing (and also known as manufacturing tolerances) and fit loosely over the second pin 631 yet locate and orient the inner part with respect to the peripheral part.

It would be appreciated that although the above examples show the use of two pins co-operating with two pin holes any suitable number of pins and pin-holes may be used in some embodiments providing each pin may co-operate with a pin hole. Furthermore in some embodiments the configuration of pins and pin holes may be such that the inner part may only be orientated in one direction on the outer part. For example this may be achieved in some embodiments by the arrangement of pins having rotational asymmetry. Furthermore although as shown in FIG. 7e the pin is shown as part of the inner frame and a recess is present in the outer frame it would be appreciated that in some embodiments the pin may be part of the outer frame and may co-operate with the pin-holes in the flexible membrane and also with associated recesses in the inner frame.

With respect to FIG. 8a some embodiments showing the co-operation between the peripheral part or first part 253, the inner part or second part 251, the flexible membrane 211 and the actuator 701 for generating a force to the inner part 251 are shown in further detail. In these embodiments as described above the inner part is connected to the outer part by the flexible membrane which is attached at a first area of contact to the first part and at a second area of contact to the second part.

In the example shown in FIG. 8a the actuator may be a piezo or any other suitable actuator which is 'located' with respect to the peripheral part 253 and generates a force to the inner part 251 which is able to move because of the limited damping force response from the flexible membrane 211 to produce the localized haptic feedback.

With respect to FIG. 8b further embodiments showing the co-operation between the peripheral part or first part 253, the inner part or second part 251, the flexible membrane 211 and a further configuration of an actuator 703 for generating a force to the inner part 251 is shown in further detail. The configuration of the inner part 251 the outer part 253 and the flexible membrane is as described above. However in such embodiments the actuator 703 is 'located' with respect to the inner part 251 and generates a force against the peripheral part 253. As the inner and outer parts are connected via the flexible membrane the force generated against the peripheral part is experienced as a reaction force by the inner part 251 and the limited or marginal damping force response from the flexible membrane 211 allows the inner part to move in response to the reaction force to produce the localized haptic feedback.

With respect to FIG. 8c a third group of embodiments showing the co-operation between the peripheral part or first part 253, the inner part or second part 251, the flexible membrane 211 and an actuator 705 connected only to the inner part 251 configured to generate a force to the inner part 251 is shown in further detail. The configuration of the inner part 251 the outer part 253 and the flexible membrane is similar to the configuration with the two above embodiment groups described above. However in these embodiments the actuator 703 is only 'located' with respect to the inner part 251, in other words is connected only to the inner part 251. The actuator may therefore be a vibra or eccentric mass force generator which when actuated generates a force as a reaction to its action. As the inner and outer parts are connected via the flexible membrane the force generated is experienced by the inner part 251 and the limited or marginal damping force response from the flexible membrane 211 allows the inner part to move in response to the reaction force to produce the localized haptic feedback.

Furthermore although the flexible membrane is described above as a single layer or material, it would be appreciated that the flexible membrane may be any suitable material or composite material layer.

Therefore in summary the application in some embodiments is an apparatus comprising: a first part configured to form at least part of the case of the apparatus; a second part configured to form at least part of the display for the apparatus; and a flexible membrane attached at a first area of contact to the first part and at a second area of contact to the second part and furthermore configured to connect the first part to second part.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
a first part forming at least part of a case of the apparatus;
a second part forming at least part of a display for the apparatus;
an actuator for generating a feedback force for transmission to the second part; and
a flexible membrane having a first area of contact and a second area of contact, said flexible membrane being attached to the first part at the first area of contact and second part at the second area of contact, said flexible membrane thereby flexibly connecting the first part to the second part,
wherein the second part comprises a front window layer, at least one display layer, and at least one touch interface layer, said front window layer overlying said at least one display layer and said at least one touch interface layer,
wherein the flexible membrane is at least part of one of the at least one display layer and the at least one touch interface layer,
wherein the first part comprises: an outer casing part; and an inner frame part, wherein the first area of contact of the flexible membrane is attached between the outer casing part and the inner frame part, and
wherein the flexible membrane permits transmission of the feedback force generated by the actuator to the second part with negligible damping.

2. The apparatus as claimed in claim 1, wherein the actuator is at least one of:
a piezo-actuator;
a dynamic eccentric mass actuator;
a moving coil actuator; and
a moving magnet actuator.

3. The apparatus as claimed in claim 1, wherein at least one of the flexible membrane and the second part is configured to generate audio waves in response to the feedback force.

4. The apparatus as claimed in claim 1, wherein the flexible membrane comprises at least one of:
an elastomer;
a silicone foil;
a polyethylene terephthalate (PET) polyester film; and
a polycarbonate film.

5. The apparatus as claimed in claim 4, wherein the flexible membrane has a thickness substantially in the range from 0.025 mm to 0.18 mm.

6. The apparatus as claimed in claim 1, wherein the flexible membrane is attached to at least one of the first part and the second part by a layer of optically clear adhesive.

7. The apparatus as claimed in claim 1, wherein the flexible membrane has at least one hole cooperating with an associated pin on the first part so as to locate the flexible membrane and the second part with respect to the first part.

8. The apparatus as claimed in claim 1, wherein the negligible damping of the feedback force produces a localized haptic feedback to a user.

9. A method of operating an apparatus comprising a first part forming at least part of a case of the apparatus; a second part forming at least part of a display for the apparatus; an actuator for generating a feedback force for transmission to the second part; and a flexible membrane having a first area of contact and a second area of contact, said flexible membrane being attached to the first part at the first area of contact and to the second part at the second area of contact, said flexible membrane thereby flexibly connecting the first part to the second part, wherein the second part comprises a front window layer, at least one display layer, and at least one touch interface layer, said front window layer overlying said at least one display layer and said at least one touch interface layer, wherein the flexible membrane is at least part of one of the at least one display layer and the at least one touch interface layer,
wherein the first part comprises an outer casing part, and an inner frame part, and wherein attaching the first area of contact of the flexible membrane comprises attaching the flexible membrane between the outer casing part and the inner frame part, and
wherein the flexible membrane permits transmission of the feedback force generated by the actuator to the second part with negligible damping, the method comprising transmitting a feedback force from the actuator to the second part.

10. The method as claimed in claim 9 further comprising generating audio waves in response to the feedback force.

11. The method as claimed in claim 9, further comprising attaching the flexible membrane to at least one of the first part and the second part by a layer of optically clear adhesive.

12. The method as claimed in claim 9, further comprising locating the flexible membrane and the second part with respect to the first part by providing the flexible membrane with at least one hole cooperating with an associated pin on the first part.

13. The method as claimed in claim 9, wherein the negligible damping of the feedback force produces a localized haptic feedback to a user.

* * * * *

UNITED STATES PATENT AND TRADEMARK OFFICE
CERTIFICATE OF CORRECTION

PATENT NO. : 9,916,007 B2
APPLICATION NO. : 13/505988
DATED : March 13, 2018
INVENTOR(S) : Thorsten Behles and Klas Andersson Page 1 of 1

It is certified that error appears in the above-identified patent and that said Letters Patent is hereby corrected as shown below:

In Claim 1:
Column 15, Line 50, "second part" should be deleted and --to the second part-- should be inserted.

Signed and Sealed this
Twenty-fourth Day of April, 2018

Andrei Iancu
*Director of the United States Patent and Trademark Office*